June 3, 1958     G. L. CORSI     2,837,359
METAL REINFORCED ROTARY SHAFT SEAL
Filed April 8, 1955     2 Sheets-Sheet 1

June 3, 1958 — G. L. CORSI — 2,837,359
METAL REINFORCED ROTARY SHAFT SEAL
Filed April 8, 1955 — 2 Sheets-Sheet 2

United States Patent Office 2,837,359
Patented June 3, 1958

2,837,359

METAL REINFORCED ROTARY SHAFT SEAL

George L. Corsi, Detroit, Mich., assignor, by mesne assignments, to Federal-Mogul-Bower Bearings, Inc., Detroit, Mich., a corporation of Michigan Application April 8, 1955, Serial No. 500,161

3 Claims. (Cl. 288—9)

This invention relates to shaft seals and more particularly to a unique seal construction featuring simplicity, ruggedness, flexibility in its mode of application, ease of installation yet great retentive power, low cost, and others. An improved method for making this seal is claimed in a divisional application, Serial No. 676,465, filed July 26, 1957.

One of the prime objects of the invention is the provision of a seal design wherein the reinforcing ring for the resilient sealing element is substantially enclosed except for a narrow exposed band arranged to provide a metal-to-metal contact with the supporting structure for the seal at its point of use.

Another object is the provision of a shaft seal having a reinforcing ring embedded within a molded sealing element and having a rim adapted to be exposed when the outer axial edge of the seal is subjected to a finishing and sizing operation.

Yet another object is the provision of a metal reinforced shaft seal of elastomeric material having a radially exposed band of metal located between coverings of elastomer bonded to its opposite faces and acting as sealing gaskets as well as protective coverings for the metal irrespective of which way the seal is installed into a bore.

Another object is the provision of a molded shaft seal having a metal core ring encased between layers of resilient covering material, the rim edges of which cooperate with the exposed edge of the core ring to provide a gasketed metal-to-metal anchor for the seal when mounted in a housing.

Numerous other objects and advantages of the invention will become apparent from the following detailed specification covering illustrative embodiments of the invention taken in connection with the accompanying drawings, wherein.

Figure 1:
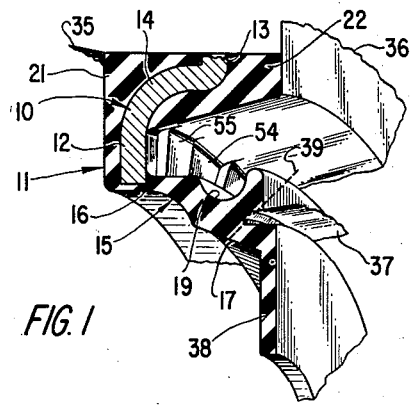
Figure 1 is a fragmentary isometric view in section through a preferred embodiment of the seal before being trimmed and sized.

Referring to the drawings, it will be seen that my lubricant sealing ring comprises but two components, namely, a cupped rigid reinforcing ring 10 and a covering of moldable resilient synthetic elastomer 11. The reinforcing ring is preferably formed from sheet steel stock of fairly heavy gauge. As shown in the preferred embodiment, the ring is ogee-shaped in cross-section and includes a radial inner rim 12, a relatively narrow radially disposed outer rim 13 lying in a plane offset axially from rim 12 and connected to its by a curved web 14. Manifestly, the shape and disposition of connecting web 14 provides a high-strength reinforcement for the inner and outer rims 12 and 13.

Figure 2:
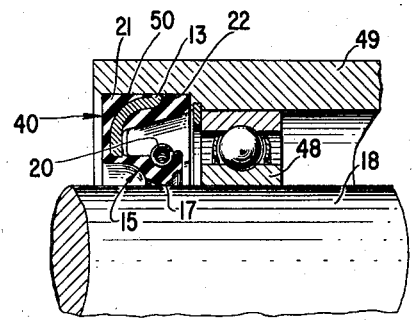
Figure 2 is a fragmentary sectional view through the finished seal as mounted on a shaft according to one mode of use.

As made clear by Figure 2, core ring 10 is substantially fully embedded in the synthetic covering of elastomer selected from any of a number of synthetic rubber compounds well-known to those skilled in this art and having high resistance to attack by lubricating mediums. Thus, both the inner and outer surfaces, and particularly the outer rim areas of the ring, are covered with thick layers of the elastomer. Integral with the inner rim of these covering layers is a sleeve-like shaft engaging lip 15 having a thin-walled flex section 16 bonded to the inner rim 12 of the ring. The opposite or free end of the sealing web 15 is provided with a sharp lip edge 17 having a diameter slightly less than that of the shaft 18 on which it is to seat in use. Encircling the exterior of lip 17 is a spring seating groove 19 for a garter spring 20.

This is an appropriate point to note that the layer of resilient covering material for ring 10 may be comparatively thin except in the area forming the outer mounting rim of the seal and generally indicated at 21 and 22. The layers at these points are very thick to form a wide cylindrical surface engagable with the bore sidewall in the place of use. These thick layers of resilient material provide sealing gaskets as well as means cooperating with the exposed edge of rim 13 for holding the seal rigidly anchored to its housing.

Figure 5:
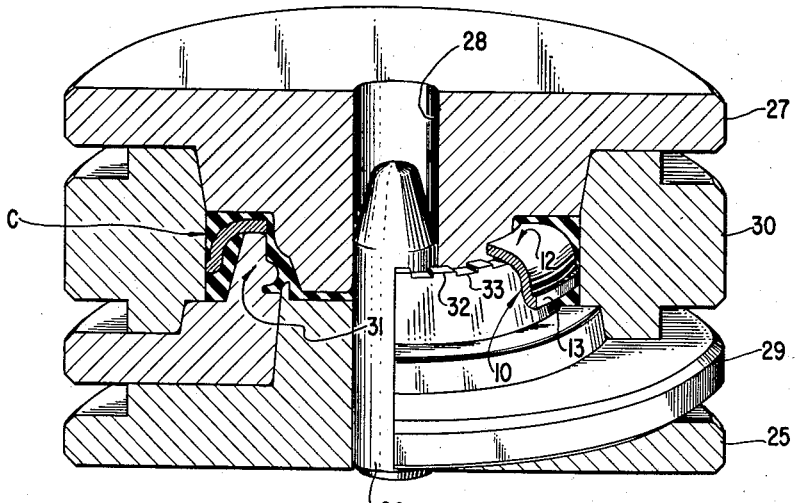
Figure 5 is an isometric view of a mold construction employed to hold the reinforcing ring centered while the prep is forced about its opposite sides.
Figure 6:
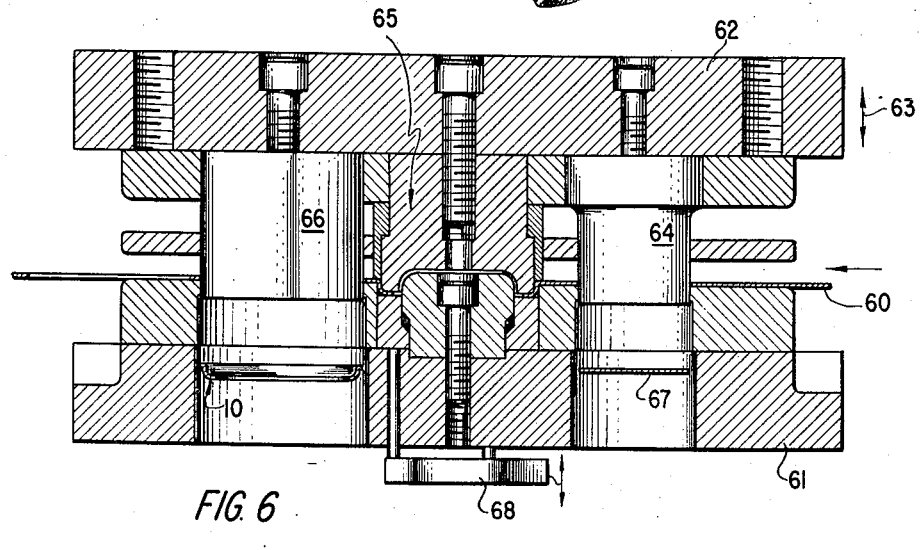
Figure 6 is a sectional view through a progressive die used in forming the reinforcing rings from strip stock.

Another interesting feature of the invention is the simple but highly efficient mode devised to hold the reinforcing ring centered in a molding cavity while the elastomeric material is forced to flow under high pressure to all parts of the cavity. Referring to Figure 5, it will be seen that the mold comprises a bed plate 25 to the center of which is attached an upright pilot pin 26 to assure proper registry with an opening 28 in the upper vertically movable closing plate 27. The two remaining principal elements of the mold include a male die ring 29 and a spacer ring 30. The mating surfaces of this mold are, of course, finished to very high tolerances so that when the parts are closed the mating surfaces will prevent the escape of stock despite the very high pressures applied against it by a conventional hydraulic press, not shown. The surfaces which cooperate to form the cavity generally indicated at C and suitable for molding the seal are shown in Figures 5 and 6.

The means for holding ring 10 centered in cavity C comprises an upstanding frusto-conical shaped spider 31 at the inner periphery of mold ring 29. The radial face of spider 31 is provided with low-height large area bosses 32 separated from one another by stock flow passages 33. Bosses 32 provide a multiplicity of extremely strong supports for inner rim 12 of the reinforcing ring. Bosses 32 also cooperate to form radial flow-passages 33 interconnecting the opposite sides of spider 31 and through which the semi-fluid uncured elastomer (known to those skilled in this art at prep) can flow quickly and in large volume during the molding operation. Note that the edge of rim 13 of the ring appears to lie flush against the inner sidewall of mold spacer ring 30. Actually, it is essential to allow for slight clearance, as otherwise too much time would be consumed in placing the ring in the mold and removing the finished product therefrom. Accordingly, a thin layer of rubber will inevitably cover edge of rim 13 during the molding operation. However, this is not objectionable since it is a simple matter, according to this invention, to remove this layer during the sizing and flash removal operation.

The molding operation is carried on in the following simple and expeditious manner. It will, of course, be understood that the mold shown in Figure 5 is placed between the upper and lower platens of a hydraulic press of the usual type employed for such operations and will have well-known provision for heating the mold to cure the elastomer. Mold ring 25 is supported on the lower platen while the upper platen bears against the upper or core ring 27. While the mold parts are in open position, ring 10 suitably coated with a bonding agent is dropped into the mold with its inner rim 12 directly supported by bosses 32 of spider 31. Note that the radial centering of the ring is facilitated by the slightly flaring inner sidewalls of spacer ring 30. After a thick ring of uncured prep has been placed on top of ring 10, and the assembly of the mold has been completed, the upper platen is energized to close the mold. As this takes place, the prep is forced to fill every part of the cavity as the air bleeds out through the closely fitting surfaces between the mold rings. Note that the stock distributed to the lower surface of the reinforcing ring must pass through the radial passages 33 between bosses 32 of the spider. The extremely high hydraulic pressures required to accomplish this flow at high speed are prevented from shifting reinforcing ring 10 in the cavity because the initial supply of prep is located above the ring. The ring cannot move downwardly because of the firm support provided by bosses 32. And, of course, the ring cannot shift laterally because it is held accurately centered by the engagement of rim 13 with sidewall of spacer ring 30. Nevertheless, a thin flash of stock does normally form between the bosses and opposed surface of the ring.

Figure 7:
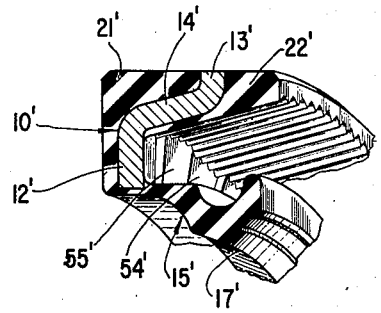
Figure 7 is a view similar to Figure 1 but showing a modified seal design.

Following curing of the elastomer by heat and pressure, semi-finished seal is removed from the mold. It then has the appearance depicted in Figure 1 due to the presence of three thin webs of flashing 35, 36 and 37, as well as a thick ring of flashing 38 generally known in the art as the hat. Flashings 35 and 36 may be removed by trimming the corners on a bevel as illustrated in Figure 7. Preferably, however, these flashings are removed simultaneously with and as an incident to the sizing and finishing operation as will be described presently. Flashing 37 and hat 38 are removed during the trimming of the seal lip 17 along the conical surface suggested by dotted line 39 in Figure 1. This lip trimming operation is carried out with the aid of a trimming machine in accordance with conventional practice.

Figure 4:
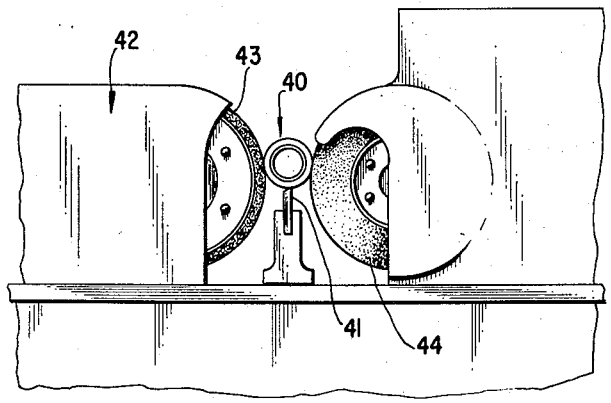
Figure 4 is an end elevational view showing one manner of finishing and sizing the seal.

The remaining operation is that of accurately sizing the seal and this can be speedily and economically performed to a high degree of accuracy in a centerless grinder of the general type illustrated in Figure 4. The seals to be finished are indicated at 40 and are arranged side-by-side as they are gradually fed axially along guide rail 41 between a back-up wheel 43 and an abrading or grinding wheel 44. Both wheels rotate toward the seal 40 but at different speeds with the result that the seal roates as its exterior surface is finished. As the seals pass through the grinder, both the synthetic material and the edge of outer rim 13 are accurately finished to the same pre-determined diameter. In other words, the finished edge of the reinforcing ring lies flush with the cylindrical surface of thick elastomer layers 21 and 22 to either side thereof. Moreover, flashing rings 35 and 36 are easily and efficiently removed as the seals progress through the grinding machine. When the seal emerges from grinder 42, it is ready for garter spring 20 and installation in the housing bore of a shaft.

One of two alternate modes of installation is illustrated in Figure 2 wherein a shaft 18 is supported by a ball bearing 48 in a housing wall 49 having an oil seal seating bore 50. The sidewall of bore 50 is finished to a diameter slightly smaller than that of seal 40. Consequently, seal 40 must be pressed into the bore under pressure. Since there is no direct backing for the thick layer 22 of elastomer, it is a simple matter to start the seal into the bore with the aid of the chamfered edges of both the seal and the housing. Once flange 13 of the reinforcing ring contacts the wall of the bore, considerably more pressure must be applied to press it into place. The pressing operation continues until the thick gasketing layer 22 abuts the shouldered bottom of the bore. The curved portion 14 of the ogee-shaped ring, together with the narrow outer rim of flange 13, provides a resilient yet high-strength anchorage between the seal and the bore wall. At the same time, the thick layers of elastomer 21 and 22 bonded to the opposite surfaces of the core ring are held firmly pressed against the bore wall to assure a fluid-tight joint without placing gasketing material under any substantial radial pressure. Consequently, there is no tendency for the gasketing material to cold-flow out of sealing contact with the bore wall. A thin narrow band of gasketing material immediately to the left of metal flange 13 is directly backed up by connecting web 14 of the ring. Accordingly, it is under somewhat greater radial pressure than the remaining portions of the gasket and provides life-long assurance of a fluid seal with the bore wall.

Figure 3:
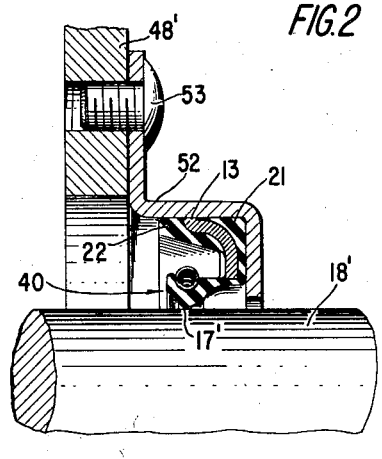
Figure 3 is a view similar to Figure 2 but showing the same mounted on a shaft according to a second mode of use.

Figure 3 is illustrative of the adaptability of the present design for mounting in a bore with either face of the seal foremost. The face of the seal which first enters the bore is commonly referred to in the art as the toe of the seal, while the trailing face is known as the heel. Thus, in the Figure 2 mounting, the thickened gasket portion 22 acts as the toe and is pressed against the shoulder at the bottom of bore 50. In the Figure 3 mode of use, gasketing layer 21 seats against the base of an adapter ring 52 and accordingly is properly termed the toe of the seal, while layer 22 becomes the heel. The adapter may be secured to the face of housing 48' as by stud screws 53. Note that in either mounting arrangement, lip structure 15 faces the interior of the housing since this is in its most effective sealing position.

It will be quite apparent from the foregoing that the disposition of layers 21 and 22 with respect to ring 10 renders the same equally effective in sealing and anchoring the sealing member in the housing irrespective of which layer is used as the leading toe edge of the casing. Likewise, outer rim 13 of the reinforcing ring is equally as effective in anchoring the seal in its installed position. Moreover, once installed, all portions of ring 10 are protected by the resilient covering material. In this connection, it will be recalled that while the drawings do not show any appreciable layer of rubber on areas 54 of rim 12, a thin flash layer is nevertheless present. To either side of these areas are the thick radial ribs 55 of rubber formed as the distribution passages 33 of the mold spider fill with rubber during the molding operation.

Passing reference should be made concerning the expeditious manner in which rings 10 are manufactured rapidly and accurately from continuous strip material. This is accomplished with a die of the type illustrated in Figure 6. The strip material 60 is supplied from a reel suitably supported to the right of this figure, and is advanced in steps between the upper and lower halves 61 and 62 of a three-stage progressive die. The upper half reciprocates through a short path indicated by the double-headed arrow 63 as the strip advances from one processing station to the next. Located on the underside of the upper die member are three cutting and forming plungers 64, 65 and 66 respectively. As strip 60 passes beneath plunger 64, slug 67 is punched out to form the inner rim of the ring. At the second station, the rounded end of plunger 65 cooperates with the lower die to form the reversely curved web 14 portion of ring 10. As the upper die member retracts from this forming operation, an ejecting plunger 68 moves upwardly to facilitate the movement of strip 60 to its third station beneath plunger 66 which functions to shear the finished ring from the strip and eject it downwardly through the enlarged opening in die member 61.

The foregoing mode of forming the casing rings is fast, eliminates the need for manual handling of the casings, and provides ogee-shaped casings with great uniformity despite the short radial length of outer flange 13 and the need for an accurate cylindrical surface across its edge. As a result, the ring discharged from this progressive die can be routed directly to the molding presses without a preliminary finishing operation other than the customary degreasing and coating with a bonding agent.

Figure 8:
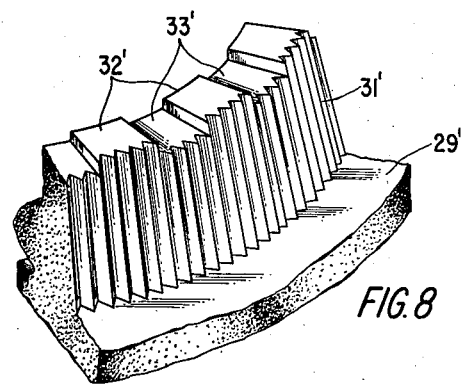
Figure 8 is a fragmentary view of the male die ring used in molding the modified seal construction.

A slightly modified embodiment of the invention is shown in Figure 7, while the mold spider employed in its manufacture is shown in Figure 8. In each instance, the same or corresponding parts of the first described embodiment have been designated by the same reference characters distinguished by a prime. There are only two principal differences in the design, namely, the shape of ring 10' and the manner in which this ring is held centered in the mold cavity during the molding operation. The connecting web 14' is of fusto-conical shape rather than curved as shown in Figure 1 in order that the ridges of the fluted outer surface 31' of the mold spider may directly contact the inner sidewall of web 14'. Likewise, the exposed upper ends of bosses 32' of the die seat against and support the inner surface of flange 12' of the ring.

While web 14' of the ring has been shown as flaring outwardly from inner flange 12' and the fluted surface 31' of the mold spider has been shown as flaring in the same degree, it will be obvious that web 14' and the fluted portion of the spider may be of cylindrical formation. This alternate shape will facilitate the manufacture of the mold and assure more accurate centering of ring 10' in the mold cavity. It will likewise be understood that the many advantages flowing from this method of centering a core ring in a mold cavity may be enjoyed whether or not the seal has an exposed outer radial flange similar to flanges 13 and 13'. The important consideration is that the mold spider 31' be provided with a plurality of bosses 32' and intervening depressions 33', or with closely spaced, alternately arranged ridges and valleys to hold the metal core accurately centered in the cavity while permitting free flow and distribution of prep material to all parts of the cavity and without danger of deforming or displacing the ring.

The alternate seal design requires certain trimming, sizing and finishing, and these are preferably carried out in exactly the same manner described above for the first embodiment.

From the foregoing, it will be appreciated that a simple, versatile and highly efficient shaft seal can be made in accordance with the foregoing teachings employing merely a metal core ring embedded in synthetic elastomeric except for a narrow exposed band of material at its outer periphery. This band of material is bordered by two heavy layers of elastomeric, either of which can be employed as the toe or as the heel of the seal rim. In either case, the exposed band of metal forms a positive anchorage for locking the seal within its housing while resilient layers to either side provide a shrinkproof fluid-tight gasketing and supplement the action of the metal-to-metal contact in anchoring the seal in its mounting.

It will also be appreciated that the invention provides a simple and more economical method of simultaneously sizing, deflashing and finishing the mounting periphery of a shaft seal.

While only a restricted number of embodiments of the invention have been specifically disclosed hereinabove, various alternate constructions will be readily recognized by those skilled in the art to which the invention relates as coming within the principles set forth above.

I claim:

1. A shaft seal, including in combination a unitary rigid metal reinforcing ring having a first radial flange and a second radial flange joined by a generally axially extending web portion, said first flange extending radially inwardly from said web portion and said second flange extending radially outwardly therefrom, one said radial flange terminating in a cylindrical rim edge; and a unitary resilient synthetic rubber member enclosing and bonded to substantially the entire surface of said ring except for said rim edge, said rubber member having a cylindrical periphery flush with said rim edge and having integral therewith a shaft-engaging lip extending from the radial flange other than the one having said rim edge, said lip being concentric with said rim edge.

2. The seal of claim 1 wherein said lip is displaced axially with respect to said first flange and lies substantially in the same radial plane as said second flange.

3. A shaft seal having an imperforate rigid reinforcing ring of uniform thickness including a generally axially extending portion having a radially wide, radially extending, first flange at one end and a radially narrow, second flange extending radially from the other end in the opposite radial direction from said first flange and terminating in an axial peripheral edge, said ring being embedded within a unitary ring of resilient material except for said axial edge, which is exposed, said resilient material having a radially wide radial face lying on the opposite side of said first flange from said axially extending portion and joining one end of an axially wide cylindrical surface flush with said axial edge, the other end of said cylindrical surface meeting a radially narrow radial face which joins a frustoconical face that leads to another radial face, which, in turn, terminates at an axially extending lip portion that lies on the same axial side of said first flange as said second flange, both ends of said cylindrical surface being adapted to form a combined gasket and pilot for said seal when said seal is pressed into position.

References Cited in the file of this patent

UNITED STATES PATENTS

| | | |
|---|---|---|
| 1,195,204 | Gleason | Aug. 22, 1916 |
| 2,173,186 | Swartz et al. | Sept. 19, 1939 |
| 2,208,482 | Victor | July 16, 1940 |
| 2,249,141 | Johnson | July 15, 1941 |
| 2,316,713 | Proctor | Apr. 13, 1943 |
| 2,456,615 | Berglund | Dec. 21, 1948 |
| 2,587,405 | Stevens et al. | Feb. 26, 1952 |
| 2,697,623 | Mosher | Dec. 21, 1954 |

FOREIGN PATENTS

| | | |
|---|---|---|
| 692,717 | Great Britain | June 10, 1953 |